Dec. 19, 1939.  U. B. BRAY  2,183,781

SPRAY OIL

Filed Jan. 27, 1936

INVENTOR.
Ulric B. Bray
BY
Philip Subkow
ATTORNEY.

Patented Dec. 19, 1939

2,183,781

UNITED STATES PATENT OFFICE 2,183,781

SPRAY OIL

Ulric B. Bray, Palos Verdes Estates, Calif., assignor to Union Oil Company of California, Los Angeles, Calif., a corporation of California Application January 27, 1936, Serial No. 60,941

12 Claims. (Cl. 196—149)

The invention relates to spray oils produced from petroleum and adapted to the preparation of emulsions and the like for the production of insecticides and fungicides in general, particularly for use of plant insecticides with special reference to the control of citrus pests of which the scales are important examples.

The principal object of the invention is to produce a spray oil, of high toxic power which is non-injurious to tender foliage and fruit. It has in the past been a desideratum to produce such spray oils having non-phytocidal properties, but in general when these have been obtained the insecticidal value has not been sufficiently high.

I have discovered that it is possible to treat naphthenic type petroleum stocks so as to produce non-phytocidal oils which retain certain types of low A. P. I. gravity materials largely aromatic in character which are good insecticides but are non-toxic to plant life, at least in the proportions retained; whereas heretofore these materials have been removed with strong sulfuric acid. In other words, not all materials containing aromatic or other structures which can be attacked and removed by strong sulfuric acid are necessarily injurious to plants. Such materials which are non-injurious to plants but can be removed by strong sulfuric acid are at the same time more effective as insecticides than are the high gravity more paraffinic compounds which are not attacked by strong sulfuric acid or the like and commonly used as insecticidal spray oils for fruit and plant life. The present products are to be obtained from naphthenic type petroleums, it being difficult, if not substantially impossible, to obtain them from paraffinic type oils.

The present invention, therefore, resides in an oil producible from naphthenic type petroleum stocks, and in a process for producing such oil, wherein the sulfonatable residue (i. e., that proportion which may be attacked and removed by sulfuric acid by a certain well known method herein described), is somewhat greater than about 20%, and at the same time is not toxic to tender fruit and foliage in the concentrations in which this general type of oil is employed, while being of high insecticidal value for scale and similar citrus pests and other pests. Such an oil has an overall oxidation number somewhat higher than that of the ordinary oils of very low sulfonatable residue and the oxidation numbers of corresponding fractions are also in general higher, but the oil contains only a very small percentage (about 5%) of materials having oxidation numbers above the highest oxidation numbers (of the corresponding fraction) of the oils of very low sulfonatable residue. These high oxidation number materials are less than about 100 on the Sligh scale (hereinafter defined) as against over 250 for the stocks from which these oils are made.

Thus, the oxidation numbers and the percentage of sulfonatable residues together constitute a definition of the oils of this invention.

Otherwise stated, the invention resides in a mineral spray oil produced by a sufficiently careful treatment of the naphthenic type stock to remove practically all of the unsaturated and readily reactive components such as the olefinic type of unsaturates, while leaving a product non-toxic to plants although containing appreciable quantities of low A. P. I. gravity aromatic materials (e. g. heavier than 18 A. P. I. gravity) which greatly increase the insecticidal characteristics. These oils at the same time possess a higher, though not excessive, overall Sligh oxidation number (above about 20 and below about 30) and a higher sulfonatable residue value than those commonly known at present as non-phytocidal mineral spray oils of high unsulfonatable residue wherein more than about 90% is composed of unsulfonatable (highly paraffinic) constituents by the de Ong test hereinafter described. Such oils are heavier than conventional spray oils, having an A. P. I. gravity ordinarily below 27 and above 23.

In carrying out this invention, the stock employed is subjected to a carefully controlled acid treatment to avoid excessive removal of materials in the sulfuric acid while at the same time removing substantially all of the readily reactive materials which include substantially all of the unsaturated materials including the olefinic types, though not necessarily all unsaturated materials. Thus, a low paraffinicity stock high in aromatic and hydroaromatic or naphthenic materials may be treated, preferably in a plurality of treatments. The temperature is controlled so as not to exceed about 100° F. This treatment may commence at about 70° F. to 75° F. and be allowed to rise during the various steps but not to exceed 100° F. or 105° F.

Thus, I have treated a spray oil stock produced from a San Joaquin Valley crude, such as Poso Creek, Coalinga or McKittrick crude as an overhead distillate having the following characteristics as typical:

| | |
|---|---|
| Viscosity, Saybolt Universal | 106 sec. at 100° F. |
| Viscosity gravity constant | 0.892 |
| A. P. I. gravity at 60° F. | 21.4 |
| Flash point | 310° F. |
| Pour point | Minus 30° F. |
| Sligh oxidation number | 180 |
| De Ong number | 63.8 |

This treatment comprised three successive acid treatments, each of which employed 25 pounds 98% sulfuric acid per barrel, or a total of 75 pounds per barrel at temperatures slightly less than about 100° F. In order to improve color, about 3% by weight of clay was employed in each instance. The acid treatment may also be effected in two operations using a little more acid totalling about 80 to 85 pounds of acid in two equal dumps, and similar results may be effected in one operation with still more acid, or about 100 pounds of acid per barrel, but the three stage treatment is preferred both because of greater acid economy and preferable results. In any event, the same temperature control is maintained.

The product obtained was a desirable spray oil typical of the present invention having the following characteristics:

| | |
|---|---|
| Viscosity, Saybolt Universal | 91 sec. at 100° F. |
| Viscosity gravity constant | 0.874 |
| A. P. I. gravity at 60° F. | 24.2 |
| Flash point | 305° F. |
| Pour point | Below −30° F. |
| Sligh oxidation number | 25 to 27 |
| De Ong number | 77.1 |

Various other oils according to this invention will fall generally within the following ranges:

Viscosity between about 60 and 100 seconds Saybolt Universal; A. P. I. gravity at 60° F. between 23 and 28; Sligh oxidation number (overall) between 20 and 30; de Ong number below about 80 and ranging down to around 65 or lower; and pour point below 0° F.

Comparing with a standard spray oil having a high unsulphonatable residue (de Ong number of about 90 or higher), such a high de Ong oil has the following characteristics:

| | |
|---|---|
| Viscosity, Saybolt Universal | 93 sec. at 100° F. |
| Viscosity gravity constant | 0.848 |
| A. P. I. gravity at 60° F. | 27.9 |
| Flash point | 310° F. |
| Pour point | −30° F. |
| Sligh oxidation number | 19 |
| De Ong number | 92.3 |

Specifications for the Sligh oxidation test are defined in A. S. T. M. Proceedings, vol. 27 (1927) Part I, page 461. Briefly, 10 grams of oil are placed in an oxygen filled flask which is sealed at atmospheric pressure and immersed in an oil bath at 200° C. for 2½ hours. Following cooling, the oil is diluted to 100 m. l. with standard A. S. T. M. precipitating petroleum naphtha, shaken and allowed to precipitate while standing for 1 hour at 25° C. ±2°. The residue is filtered out and weighed. The percentage thereof multiplied by 100 is the Sligh oxidation number.

Inasmuch as "de Ong" number has come to be commonly used as an indication of the unsulphonatable residue of an oil, de Ong number is here used for the same purpose. However, whereas unsulphonatable residue has commonly been accepted in the past as a measure of the phytocidal and insecticidal characteristics of an oil, such an application is not so used nor accepted here, as will become apparent presently. The de Ong number may be defined as the unsulphonatable percentage residue of an oil as determined by specifications for such a test as given in Industrial and Engineering Chemistry, vol. 18 (1926) page 175. Briefly, the oil is treated with sulphuric acid exactly 37 normal (100%) in a water bath at 95° to 100° C.—ordinarily at 210° to 212° F.—for a period of one hour, 20 c. c. of the above acid being added to 5 c. c. of oil in two dumps in a Babcock cream test bottle, the mix being agitated every 10 minutes. After phase separation, the percentage of unsulphonated residue is the de Ong value.

In the light of my discoveries it appears that the de Ong test for spray oils is largely a test for aromatic nuclei which can be sulfonated with 100% sulphuric acid at 212° F. (100° C.) as well as a test for reactive and readily acid soluble compounds, and that the presence in a compound of an aromatic nucleus which can be sulfonated by strong acid at superatmospheric temperature is not a criterion of the phytocidal characteristics of the compound. In other words, there are two general types of compounds soluble in sulphuric acid in the de Ong test with 100% acid at 212° F. (100° C.), namely the unsaturates or readily reactive materials and the aromatic compounds or less readily reactive materials. Only those which can be classified as unsaturates or otherwise readily chemically reactive, appear to be strictly toxic to the plant.

According to the present invention the chemically reactive (phytocidal) materials are removed and the greater proportion of the less reactive or relatively non-reactive (non-phytocidal) or aromatic components or all of such relatively non-reactive or aromatic components are allowed to remain in the oil, even though some of these non-phytocidal components are characterized by relatively low de Ong numbers and have a relatively low A. P. I. gravity.

When I use the term "chemically reactive" I refer to those materials which are injurious to plants when used thereon as spray oils either in the well known and customary form of emulsions or in any other form suitable for application.

Various methods of producing emulsions for these purposes are well known in the art. Thus, according to one approved practice, a 1½% to 2% emulsion of the spray oil is prepared using ammonium caseinate as an emulsifier, and this emulsion is sprayed upon the citrus trees and their fruit, the emulsion being such as to break easily and leave a film of oil. By such an application of the oil of the present invention, a complete kill of scale has resulted and after many weeks no objectionable influences upon either foliage or fruit have been observable. These tests have been conclusive, although contrary to previously approved theories regarding de Ong values.

In order better to visualize the constitution of the spray oil of the present invention the accompanying drawing is furnished. In the drawing.

Figure 3:
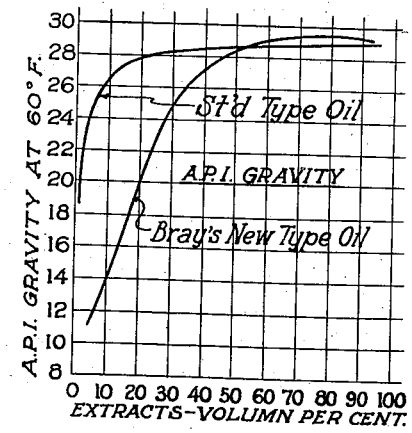

Fig. 3 shows similar curves plotting the A. P. I. gravity of these same types of oils.

Figure 1:
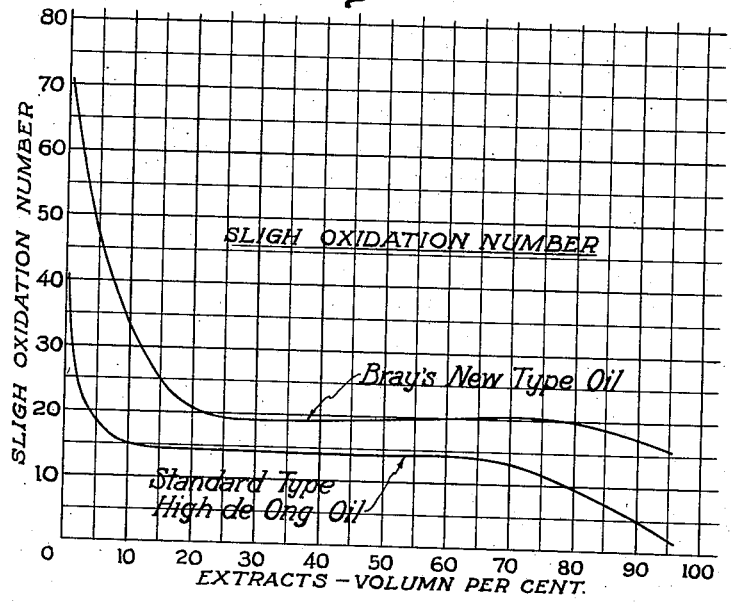
Fig. 1 shows curves representing the averages of Sligh oxidation numbers of a series of fractions averaging about 5% each, and indicative of a composite of oils of the type of the present invention in comparison with similar series of fractions of conventional spray oils having high overall de Ong numbers (above 90)
Figure 2:
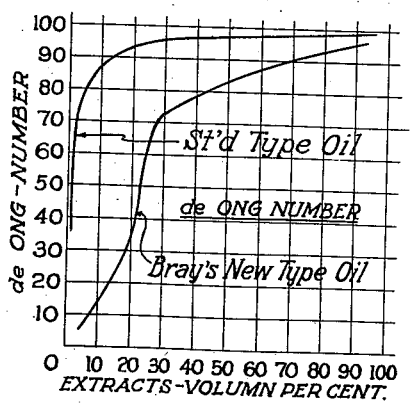
Fig. 2 shows similar curves plotting the de Ong numbers of these oil types.

Spray oils of the new type have de Ong numbers less than about 80 and those illustrated have de Ong numbers lying between 75 and 80. Such oils however, may be prepared with de Ong numbers extending even below 75, but probably not falling below 70, and still be useful for the present purpose. This distinguishes from the type of high de Ong oils illustrated wherein the de Ong number runs around 93. As indicated by the curves of Fig. 2, the average conventional high de Ong oil contains fractions ranging from about 36 de Ong number to about 99 de Ong number, the great bulk of the materials being above 90. On the other hand, the new oil of the present invention contains materials ranging as low as 6 de Ong number up to as high as 96 de Ong number, with the average far below 90.

In segregating various fractions of the oils tested in order to determine the de Ong numbers, Sligh oxidation numbers and A. P. I. gravities of the various fractions, the oil was subjected to a series of extractions with appropriate solvents starting at low temperatures and rising through a fairly wide temperature range as successive extractions were made. Thus, solvent extraction with sulphur dioxide was employed in some cases, starting at −25° F. and working up to 125° F. about 150 volume percent of solvent being employed in each extraction. Again liquid sulphur dioxide was used at the lower temperatures (around −25° F. to −30° F.) in about the same proportions, but liquid sulphur dioxide-benzene mixtures (75% sulphur dioxide) were employed in amounts of about 100 volume percent of solvent at temperatures extending above about 75° F.

In this manner, a large series of fractions of successively varying aromatic content were obtained, the content of the aromatic and unsaturated constituents in the oil being greatest in the extracts first made, i. e., at the lowest temperatures, and the aromatic content gradually decreasing until the final fractions were almost entirely paraffinic in character. This procedure was found to yield a good analytical segregation of the various fractions as evidenced particularly by the uniform rise in curves of Figs. 2 and 3. In some instances a certain jaggedness was found to develop in the curves for the Sligh oxidation number, especially in those fractions having the higher numbers, but for the most part these were within the range of experimental error in conducting the tests or attributable to other irregular factors accompanying the tests.

Referring to the de Ong constitution of the present oil as compared with the conventional high de Ong oil, having Fig. 2 in mind, it will be noted that less than 10% of the standard or conventional type (high de Ong) oil falls below 85 de Ong number (85% unsulphonatable residue), whereas with the new type oil around 50% falls below 85 de Ong number. Since these oils thus possess widely different characteristics in so far as de Ong number, Sligh oxidation number and gravity are concerned, and since according to the commonly accepted theory of de Ong number, they would have been classed as toxic to plant life, these oils were subjected to comparative tests. When used to treat citrus fruits and foliage, both oils tested 100% negative as regards plant injury. As a further check on toxicity the oils were tested on geraniums, which are very tender and respond very quickly. In this series of tests the new spray oil of the present invention tested about 99% negative on the geraniums as against 100% for the high de Ong oil. This was despite the fact that in the new oil there is a much larger percentage of material, which when segregated has a positive toxic action upon geraniums, than there is in the conventional high de Ong oil.

As has been indicated, the new oil here disclosed is a type oil representing the general character of oils of this invention. Such oils have a de Ong number lower than about 80, that is, the sulphonatable residue exceeds about 20%, less than about 5% having a Sligh oxidation number above about 80, there being very little if any content over about 100 Sligh. Although the oil of this invention is non-toxic to plant life, it nevertheless contains nearly 20% of materials of higher specific gravity than the heaviest material of the conventional high de Ong oil of about the same boiling range and also 20% of materials having lower de Ong numbers than the lowest corresponding fraction of the high de Ong oil. At the same time, 15% to 20% is higher than about 30 in Sligh oxidation number, while all its fractions possess a Sligh oxidation number higher than about 15 (although not over about 5% is over 80 Sligh number) and 80% of the oil averages about 20 Sligh number. The conventional high de Ong spray oil, on the other hand, contains about 90% of materials having a Sligh oxidation number less than about 15, and less than about 5% has a Sligh number materially over 20. The overall Sligh oxidation numbers of these new oils will fall between about 20 and about 30 within the range of experimental errors.

It is of outstanding significance that the oil of the present invention has non-toxicity value for citrus fruit and foliage and similar plant life, commercially equal to that of the conventional high de Ong oil in spite of the fact that its overall oxidation number is higher, and that the oxidation number of its corresponding percentage fractions is lower than that of the conventional high de Ong spray oil. Heretofore, it has been believed that non-phytocidal spray oils must have a de Ong number at least as high as about 90 and certainly much above 80, whereas my discoveries have shown that properly prepared materials may have de Ong numbers materially less than 80 and possess greater insecticidal value without being more toxic to the plant life upon which they are designed to be used.

Looking at the oil content from the viewpoint of gravity, the new oil contains over 15% of materials heavier than 18 A. P. I. gravity, whereas a standard or conventional high de Ong oil contains substantially nothing below 18 A. P. I. gravity. Again, where the conventional oil contains only 20% to 30% of materials below about 28 A. P. I. gravity the new oil contains 40% to 50% of such heavier materials or nearly twice as much thereof. Whereas, such percentages of materials of greater specific gravity have heretofore been considered to render these products useless as spray oils, it has now been discovered that it is the type of material that controls—not its gravity or de Ong number.

The present oils are distinguished from conventional "red" oils (acid treated oils) in that such "red" oils have considerably higher oxidation numbers than the oils of this invention. Thus, said "red" oils will in general have overall Sligh oxidation numbers in excess of about 50, and portions thereof will run as high as 150 oxidation number or even higher. Again, a content of 30%–35% of such "red" oils, which percent is removable from the remainder as a plurality of fractions by extraction as above described, has an overall average Sligh oxidation number of about 75 or higher. In other words, such ordinary acid-treated or "red" oils have very large percentages of high oxidation number materials as compared with the oils of the present invention; and similarly the oils of this invention have relatively large percentages of higher oxidation number materials than the conventional spray oils of high de Ong number now commonly in use and herein mentioned.

As a modification of the present invention, oils of naphthenic type may be produced from paraffinic type oils by cracking, and such stocks then subjected to treatment similar to that above disclosed for the production of oils analogous to the new products above disclosed. Thus, a gas oil of paraffinic character (or for that matter a gas oil of naphthenic type) may be subjected to a cracking operation in a recycling cracking unit at a temperature around 880° F.–920° F. under a pressure which may approximate 850 lbs. per sq. in. (or at similar temperatures and pressures within cracking practices well known in the art), sufficient fresh gas oil being added to the cycle stock as cracking proceeds to maintain the feed to the charging pumps. The cracked product may then be fractionated to produce a suitable spray oil stock such as one having an A. P. I. gravity at 60° F. of 11 to 20 and viscosity Saybolt Universal of 50–60 at 100° F. and a de Ong number of 15 to 50 with an average boiling point of about 600° F. This material is then subjected to an acid treatment similar to the multistage treatment above described in order to remove the more reactive aromatic and unsaturated constituents. Thus, it may be treated with 25 lbs. of concentrated sulphuric acid as previously described in each of three dumps, or if necessary, it may be treated with equal amounts in each of four dumps, or in a fewer number of dumps totalling 75 to 100 lbs. of acid per bbl. to be followed in the usual way by neutralization with caustic, water washing, and treatment with clay (e. g., 3% of Death Valley clay), as well understood in the art.

Such an oil may have a de Ong number of approximately 30 and when applied as a spray oil, emulsion or otherwise, will evaporate quite readily so that after it has effectively killed pests upon plant life it will then entirely evaporate thereby reducing the possibility of endangering the plant by reason of prolonged contact therewith. Again, this oil may be subjected to a more severe acid treatment in order to raise the de Ong number to some higher value desired such as 50 or 60. Overall Sligh oxidation numbers of these oils will run from 25 to 50. Again, these oils may be blended with a conventional spray oil of high de Ong number or a white medicinal oil, such as one having a de Ong number of 98, whereby the de Ong number of the total product will lie within the range of between 50 to 80, for example, and the Sligh oxidation number from 20 to 40. Such a blended oil will release more volatile, aromatic constituents having low de Ong numbers after a time sufficient to effect a complete kill, thereby allowing the high de Ong number materials (highly paraffinic materials) to remain upon the plant or fruit for a long period of time in accordance with the prevailing practice.

According to this modification, it is apparent that naphthenic type of oils may be prepared by resorting to cracking whereby low viscosity aromatic spray oil fractions may be obtained having comparatively high volatility and low de Ong number whereby they are adapted to a quick kill of plant pests without injuring the plant, and that the benefits of prolonged contact with the more paraffinic materials may be obtained by blending highly insecticidal relatively more volatile materials with less volatile highly paraffinic materials. The characteristics of naphthenic fractions so produced by cracking paraffinic or naphthenic type oils and subsequently acid treating for use according to the present invention will in general fall within the following ranges:

| | |
|---|---|
| Viscosity Saybolt Universal | 40 to 90 sec. at 100° F. |
| A. P. I. gravity at 60° F. | 12 to 22 |
| Flash point | 240° F. to 310° F. |
| Pour point | Below 20° F. |
| Sligh oxidation number | 25 to 50 |
| De Ong number | 25 to 75 |

Blends of these materials with high de Ong materials may be prepared by combining in various proportions to obtain materials within the following ranges:

| | |
|---|---|
| Viscosity Saybolt Universal | 50 to 100 sec. at 100° F. |
| A. P. I. gravity at 60° F. | 23 to 33 |
| Flash point | 250° F. to 310° F. |
| Pour point | Below 30° F. |
| Sligh oxidation number | 20 to 40 |
| De Ong number | 50 to 90 |

It is to be understood that the disclosures hereof are merely illustrative of the generic invention and are not to be taken as limiting except as required by the prior art and the appended claims.

I claim:

1. A spray oil in the form of an extracted petroleum fraction having an A. P. I. gravity in the vicinity of 23 to 27, an overall Sligh oxidation number in excess of about 20 of which approximately 80% possesses a Sligh oxidation number between 15 and 25 and averaging about 20, the oil having a de Ong number less than about 80.

2. A mineral spray oil from which chemically reactive materials have been largely removed by solvent extraction, the oil containing aromatic constituents possessing high insecticidal properties, the oil having an overall Sligh oxidation number between about 20 and 30, about 80% of the oil having a Sligh oxidation number between about 15 and 25 and the oil having a de Ong number less than about 80.

3. A spray oil in the form of an extracted petroleum fraction, about 15% of whose content has a Sligh oxidation number over 25 but less than 5% has a Sligh oxidation number over about 80, and about 80% has a Sligh oxidation number between about 15 and about 25 and averaging about 20.

4. A non-phytocidal mineral spray oil about 15% of whose content has a Sligh oxidation number between about 25 and about 100 and about 80% of whose content has a Sligh oxidation number between about 15 and about 25, and averaging about 20, said oil having a de Ong number below about 80.

5. A non-phytocidal mineral spray oil free from readily reactive materials but containing aromatic materials, only about 15% to 20% of whose content is heavier than 18 A. P. I. and only about 30% is heavier than 24 A. P. I., the oil having an overall Sligh oxidation number between about 20 and about 50 and a de Ong number below about 85.

6. A non-phytocidal mineral spray oil containing aromatic materials but substantially free from readily reactive unsaturates, the oil having an overall de Ong number below about 80 and having about 20% of its content below about 75 de Ong with about 5% as low as 10 de Ong, the overall Sligh number of the oil being around 23 to 28, with about 80% averaging about 20 Sligh number, about 15% lying above about 25, not over 5% above about 80, and substantially no content above 100 Sligh oxidation number.

7. A naphthenic type mineral spray oil free from reactive materials toxic to plants and containing aromatic materials having highly insecticidal properties, the oil having an overall Sligh oxidation number above about 25 and below about 50 and having a de Ong number below about 80 and above about 30.

8. A non-phytocidal mineral spray oil produced from a naphthenic type material and containing aromatic constituents, the oil having an A. P. I. gravity between about 23 and 27, an overall Sligh oxidation number between about 23 and 28, and being substantially free from constituents having Sligh oxidation numbers as high as 100, and containing not more than a few percent of constituents having a Sligh oxidation number as low as 15.

9. A non-phytocidal mineral spray oil containing aromatic fractions having highly insecticidal value, the oil having an overall Sligh oxidation number between 20 and 30, an A. P. I. gravity between about 23 and 28, and viscosity Saybolt Universal at 100° F. above about 60 seconds and below about 100 seconds.

10. An oil according to claim 9 having a de Ong number below about 80.

11. A non-phytocidal mineral oil having an A. P. I. gravity between about 23 and 27 and having an overall Sligh oxidation number above 20 and below about 50, the oil containing substantially no constituents having a Sligh oxidation number above 100, the Sligh oxidation number of each successive 5% fraction separable by solvent fractionation of about 80% of the total oil being above 15 and averaging above about 18 and below about 30, and about half of the remaining 20% of the oil having Sligh oxidation numbers above 30.

12. A non-phytocidal mineral spray oil having an overall Sligh oxidation number above 20 and below about 50, the oil containing substantially no constituents having a Sligh oxidation number above 100, the Sligh oxidation number of about 80% of the oil being above 15 and averaging above about 18 and below 50, and less than about half of the remaining 20% having a Sligh oxidation number above 50.

ULRIC B. BRAY.